United States Patent Office 3,241,453
Patented Mar. 22, 1966

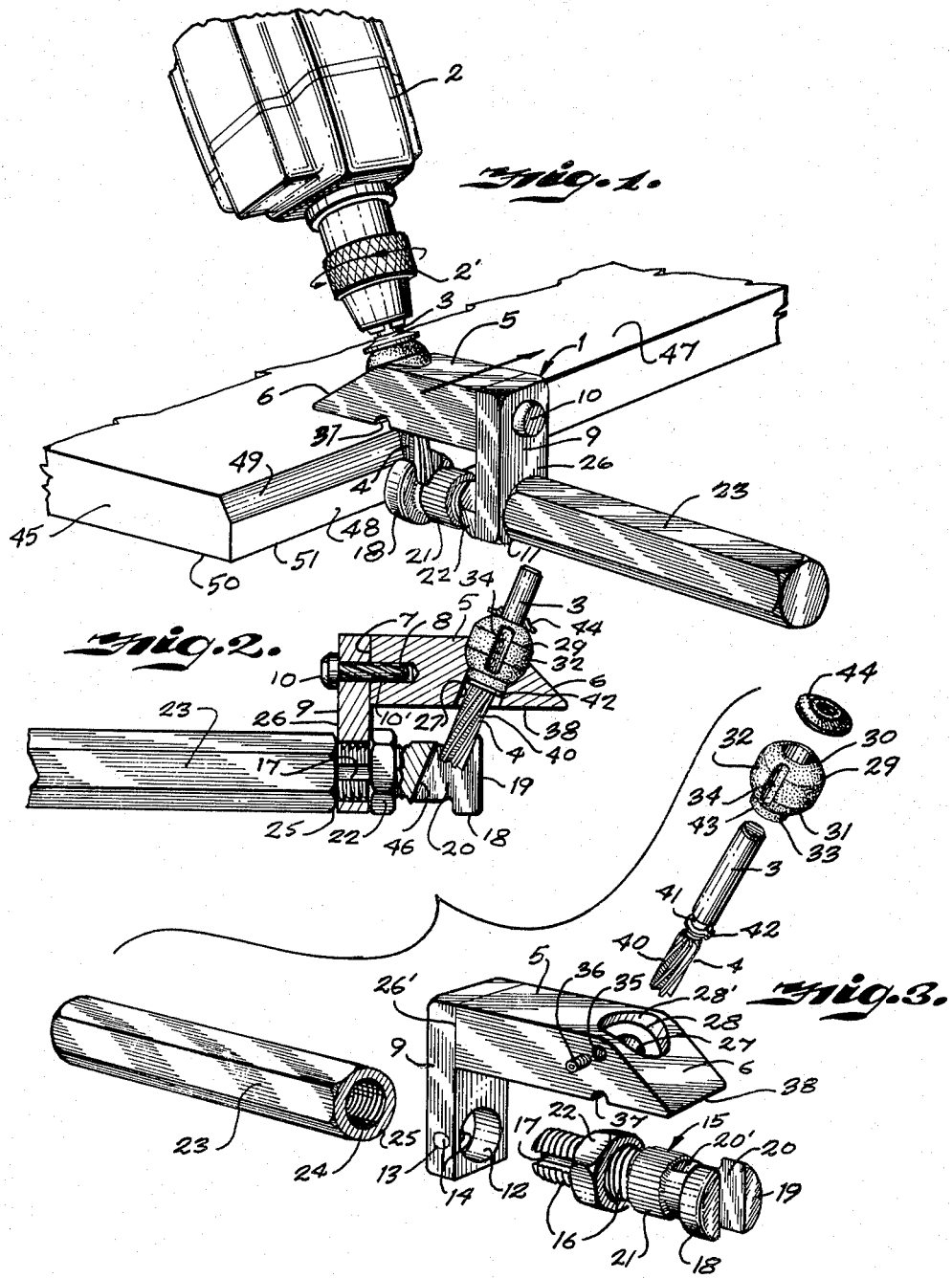

3,241,453
MULTI-PURPOSE JIG
Otis N. Baldwin, Baxter Springs, Kans., assignor of three-fourths to Carl O'Leary, Baxter Springs, Kans.
Filed June 15, 1964, Ser. No. 375,092
13 Claims. (Cl. 90—12)

This invention relates to a jig mechanism for attachment to an electric drill, and more particularly to a jig for smoothing the edges of laminated material.

Heretofore, jigs of various types have been employed with drill fixtures to bevel the edges of material, but such prior art devices have not proven entirely satisfactory due to their complicated design and construction and inefficiency in getting a smooth result.

The present device is particularly adaptable for use on laminated plastic materials as used on cabinet tops, fronts, sidewalls of furniture and wood paneling. Other uses are as a marking gauge; to trim the edge of V groove paneling to match other V grooves when placing the paneling pieces together during the installation and for smoothing jobs heretofore restricted to professional users of expensive equipment or hand work.

The principal objects of the present invention are, therefore, for smoothing the raw cut edges of various materials; to provide a jig operable by an electric drill wherein the cutter bit has a shank for engaging the chuck of the drill and extends through a stationary gauge member at an angle to allow the cutter to be drawn along the edge of the material to be shaped; to provide a bracket for the stationary gauge and upon which the gauge is mounted; to provide a handle member engaging the bracket and having a threaded opening for receiving the threaded shank of a screw adjusting member having a groove in which the cutting bit extends and by adjusting the screw in either direction the cut of the material is determined; to provide a socket in the gauge member for receiving a bearing through which the shank of the cutting bit extends and means whereby the bit is held firmly in the gauge and to provide a device of this character simple and economical to manufacture.

Other objects and advantages of this invention will become apparent from the following description taken in connection with the accompanying drawings wherein are set forth by way of illustration and example certain embodiments of this invention.

FIG. 1 is a perspective view showing my jig mechanism engaging a piece of material and beveling the edge thereof driven by an electric drill.

FIG. 2 is a partial cross sectional view of the gauge bracket and adjusting screw showing the bearing and bit carried by the gauge.

FIG. 3 is a disassembled view illustrating the respective parts of the device.

Referring more in detail to the drawings.

1 designates a jig mechanism embodying the features of my invention showing a drill 2 having a chuck 2' for attachment to the shank 3 of a cutting bit 4 mounted in a gauge member 5 having a mitered or beveled end 6. The gauge may be made of substantially ⅝ inch by ¾ inch steel and the bevel or miter being 45° on the end. The body is substantially square and one end 7 is provided with a bore 8 for attachment to an arm or bracket 9, by a pin 10 having flutes 10', the pin being driven into the opening to rigidly mount the gauge member on the bracket. The lower end 11 of the bracket 9 has an opening 12 counterbored as indicated at 13 for receiving a pin 14 sweated in for a purpose later shown.

An adjusting screw 15 is provided having a threaded shank 16 provided with a groove 17 in one side. The screw 15 has a round head 18 with a plane outer surface 19 and a groove 20 through the head and a portion of the screw shank as indicated 20'. 21 designates a knurled step portion and 22 a jam nut threaded on the shank 16. The threaded portion 16 of the screw 15 is adapted to engage in the opening 12 of the bracket 9 and is held from rotating therein by the inner end of the pin 14 engaging in the groove 17. A handle 23 is of hexagon shape and has one end longitudinally bored and threaded as indicated at 24 for receiving the threaded shank 16 of the adjusting screw 15. The end 25 of the bored end of the handle abuts against the face 26 of the bracket 9 as illustrated in FIGS. 1 and 2.

The gauge 5 has an opening 27 angled therethrough at approximately 22½° pitch toward the squared end 26' of the gauge. The opening 27 is reamed or counterbored as indicated at 28 to form a socket or cradle 28' for a bearing member 29 round on each face as indicated at 30 and 31 having a substantially straight side wall 32. The bearing includes a cylindrical extension 33 which fits into the cylindrical opening 27. The bearing is provided with a longitudinal groove 34 and the gauge is counterbored as indicated at 35 for receiving an Allen setscrew 36, the inner end of which engages in the groove 34 of the bearing member 29 to retain the same in the socket 28'.

A groove 37 is provided in the underface 38 of the gauge member and extends transversely across and intersects the opening 27. This groove or slot is ⅛ inch in diameter about ⅟₁₆ inch off center on the mitered end 6 of the gauge and provides chip clearance.

The cutting bit portion 4 of the cutter includes a plurality of flutes 40 and there is a reduced portion 41 provided between the flutes and the rounded shank portion 3 of the cutter for receiving a snap ring 42. The snap ring 42 abuts against the shoulder 43 of the depending circular end 33 of the bearing 29 and limits movement of the cutting portion 4 upwardly. A washer 44 is provided for engagement of the rounded top 30 of the bearing 29 and is of slightly dished shape to fit the top and prevents the cutter from downward movement and provides protection of the bearing 29 should the chuck of the drill accidentally slip down on the shank 3.

With a device assembled and constructed as described, the depth of cut of the cutting bit is adjusted by loosening of the handle on the threaded shank 16 of the screw member 15 and then turning of the jam nut 22 to adjust the screw inwardly or outwardly with respect to the bracket 9 so that the head 18 engages a workpiece 45. Adjustment of the screw outwardly at its maximum length allows a shallow cut of laminated material. Conversely adjusting it inwardly provides a deeper cut for ordinary work such as panel work. The angle of the cutter is 22½° and remains the same regardless of setting of the adjusting screw. It will be obvious of course, that the transverse groove 20 in the head 18 of the screw is in alignment with the cutting bit and the bottom of the groove or slot 20 is mitered or inclined away from the gauge member as indicated at 46 (FIG. 2).

After the adjustment of the adjusting screw as above set forth, the chuck 2' of the drill 2 is attached to the shank 3 of the cutting bit as illustrated at FIG. 1 and the underface 38 of the gauge member is placed in a flat position on the top 47 of the workpiece 45. The plane surface 19 of the head 18 of the adjusting screw engages against the side edge 48 of the workpiece 45 and by movement of the device to the right as shown in FIG. 1 the edge will be removed and smoothed as indicated at 49.

The device is adapted for other uses simply by turning the device over so that the underface portion 38 of the gauge will engage the underneath portion or side 50 of the workpiece and the edge or corner 51 will then be removed as the same as the first operation. Another form is by placing the underface 38 against the side edge 48 and the face 19 of the head 18 against the top face 47 of the workpiece and a different angle than the bevel 49 will be made. The device is adapted for other uses as hereinbefore stated.

It will be obvious from the foregoing that I have provided an improved jig operable from a hand drill for smoothing raw edges of laminated materials and other objects wherein the amount of beveling or work to be done may be adjusted by manipulation of the adjusting screw of the device without changing the angle of the cutting bit.

It is to be understood that while I have illustrated and described one form of my invention, it is not to be limited to the specific form or arrangement of parts herein described and shown except insofar as such limitations are included in the claims.

I claim:

1. A jig mechanism operable from a hand drill having a chuck for beveling the edges of a workpiece comprising:
   (a) a gauge member having a flat underface adapted to engage a face of the workpiece, said gauge member having an opening therethrough and a bearing socket intersecting said opening,
   (b) a bearing member having an opening therethrough seating in said socket,
   (c) a bracket having one end extending outwardly from the underface of the gauge member, said one end having an opening therethrough,
   (d) means rigidly securing said gauge member to the other end of said bracket,
   (e) a screw member having a threaded shank portion extending through the opening in said bracket, said threaded portion having a jam nut thereon and said screw member having a head on its free end having a plane surface for engaging said workpiece at a 90° angle to said gauge member and said head having a groove therein, normally in alignment with the opening in said gauge member,
   (f) a handle engaging the threaded portion of said screw member extending through the opening in said bracket, said opening in said gauge member being at an angle inclined toward said head on said screw member,
   (g) a cutter having a shank portion extending through said bearing member carried by said gauge member and adapted to be engaged by the chuck of the drill bit and having a cutting portion extending outwardly from said gauge member and its free end extending into said groove in the head of said screw member, whereby adjustment of said jam nut and said handle on said screw member will adjust said head with respect to the workpiece to vary the cut of said bit on said workpiece.

2. The apparatus of claim 1 wherein said socket has a rounded surface and said bearing member has a rounded portion engaging said rounded surface.

3. The apparatus of claim 1 including means carried by said gauge member for holding said bearing in said socket.

4. The apparatus of claim 1 including means on said cutter for preventing longitudinal movement of said cutter during use.

5. The apparatus of claim 4 wherein said last named means consists of a snap ring on said cutter between the cutting portion and the shank portion and a washer on the shank portion.

6. The apparatus of claim 1 wherein the underface of said gauge member has a transverse groove intersecting said opening and said opening is larger than the cutting portion of said cutting bit for disposal of cuttings from said bits.

7. The apparatus of claim 1 including a stepped up stop portion on said screw member to limit outward movement of the jam nut thereon.

8. A jig mechanism operable from a hand drill having a chuck for beveling the edges of a workpiece comprising:
   (a) a gauge member having a flat underface adapted to engage a face of the workpiece, said gauge member having an opening therethrough,
   (b) a bearing member having an opening therethrough, means securing said bearing in said opening,
   (c) a bracket having one end extending outwardly from the underface of the gauge member, said one end having an opening therethrough,
   (d) means rigidly securing said gauge member to the other end of said bracket,
   (e) a screw member having a threaded shank portion extending through the opening in said bracket and a head on its free end having a plane surface for engaging said workpiece at a 90° angle to said gauge member and said head having a groove therein,
   (f) means on said screw member for changing the distance of said head from said bracket and locking the same in adjusted position,
   (g) a handle engaging the threaded portion of said screw member extending through the opening in said bracket, said opening in said gauge member being at an angle with the lower portion toward said head on said screw member,
   (h) a cutter having a shank portion extending through said bearing member carried by said gauge member and adapted to be engaged by the chuck of the drill bit and having a cutting portion extending outwardly from said gauge member and its free end extending into said groove in the head of said screw member, whereby adjustment of said head with respect to the workpiece will vary the cut of said bit on said workpiece.

9. The apparatus of claim 8 including means on said cutter for preventing longitudinal movement of said cutter during use.

10. The apparatus of claim 9 wherein said last named means consists of a snap ring on said cutter between the cutting portion and the shank portion and a washer on the shank portion.

11. The apparatus of claim 1 wherein the upper face of said gauge member has a plane surface and the free end is inclined outwardly and downwardly and said inclined opening in said gauge member is at the juncture of said plane and inclined surface.

12. A jig mechanism operable from a hand drill having a chuck for beveling the edges of a workpiece comprising:
   (a) a gauge member having a flat underface adapted to engage a face of the workpiece, said gauge member having an opening therethrough and a bearing socket intersecting said opening,
   (b) a bearing member having an opening therethrough seating in said socket,
   (c) a bracket having one end extending outwardly from the underface of the gauge member, said one end having an opening therethrough,
   (d) means rigidly securing said gauge member to the other end of said bracket,
   (e) adjustable means carried by said bracket, a plane surface for engaging said workpiece at a 90° angle to said gauge member,
   (f) a handle carried by said bracket, said opening in said gauge member being at an angle toward said last named means,
   (g) a cutter having a shank portion extending through said bearing member carried by said gauge member and adapted to be engaged by the chuck of the drill bit and having a cutting portion extending outwardly from said gauge member, whereby adjustment of said last named means will adjust said means with respect to the workpiece to vary the cut of said bit on said workpiece.

13. A jig mechanism operable from a hand drill having a chuck for beveling the edges of a workpiece comprising:
(a) a gauge member having a flat underface adapted to engage a face of the workpiece, said gauge member having a bore extending therethrough at a beveling angle and opening at said underface,
(b) a bearing member having a shaft receiving bore extending axially therethrough and seating in said gauge member bore,
(c) a bracket secured to said gauge member and extending outwardly from said underface, said bracket including means forming an opening aligned with said bearing bore and a flat surface adjacent said opening and extending at right angles to said underface,
(d) a handle secured with respect to said gauge member and extending rearwardly of said flat surface,
(e) a milling cutter having a shank portion extending upwardly through and beyond said bearing member bore and adapted to be engaged by the chuck of said drill and having a cutting portion extending downwardly past said underface and into said opening, said cutting portion extending diagonally across the intersection of the planes of said underface and said surface, and
(f) adjusting means for moving said surface parallel to said underface to vary the interference of said cutting portion in said intersection.

No references cited.

WILLIAM W. DYER, Jr., *Primary Examiner.*